United States Patent
Chen et al.

(10) Patent No.: US 7,919,943 B2
(45) Date of Patent: Apr. 5, 2011

(54) FAN SYSTEM AND STARTING METHOD THEREOF

(75) Inventors: Chien-Hua Chen, Taoyuan Hsien (TW); Chia-Pin Wei, Taoyuan Hsien (TW); Wei-Shuo Tseng, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 637 days.

(21) Appl. No.: 11/976,423

(22) Filed: Oct. 24, 2007

(65) Prior Publication Data
US 2008/0131100 A1    Jun. 5, 2008

(30) Foreign Application Priority Data
Dec. 1, 2006 (TW) ............................... 95144573 A

(51) Int. Cl.
*H02P 7/29* (2006.01)
(52) U.S. Cl. .................. 318/430; 318/268; 318/484
(58) Field of Classification Search .................. 318/53, 318/66, 77, 430–434, 445, 484, 825, 829, 318/268, 452; 310/62, 63
See application file for complete search history.

(56) References Cited

U.S. PATENT DOCUMENTS

| | | | | |
|---|---|---|---|---|
| 4,928,043 A * | 5/1990 | Plunkett | | 318/400.34 |
| 5,489,831 A * | 2/1996 | Harris | | 318/701 |
| 6,932,696 B2 * | 8/2005 | Schwartz et al. | | 454/184 |
| 7,262,571 B2 * | 8/2007 | Nelson et al. | | 318/380 |
| 7,446,492 B2 * | 11/2008 | Wei et al. | | 318/275 |
| 7,570,009 B2 * | 8/2009 | Hsieh et al. | | 318/779 |
| 2006/0012929 A1 * | 1/2006 | Chen et al. | | 361/91.1 |
| 2007/0018838 A1 * | 1/2007 | Chen et al. | | 340/648 |
| 2007/0116553 A1 * | 5/2007 | Chen et al. | | 415/47 |

* cited by examiner

*Primary Examiner* — Bentsu Ro
(74) *Attorney, Agent, or Firm* — Birch, Stewart, Kolasch & Birch, LLP

(57) ABSTRACT

A fan system includes a connecting device, a controlling device and a fan device. The connecting device includes a first pin receiving at least one driving signal, and a second pin receiving a start signal, wherein a length of the first pin is greater than a length of the second pin. The controlling device is electrically connected with the connecting device and includes an enabling unit. The enabling unit generates at least one first enabling signal according to the start signal, and the controlling device outputs the driving signal and the first enabling signal. The fan device is electrically connected with the controlling device and includes at least one fan. The fan device transmits the driving signal to the fan and drives the fan according to the first enabling signal.

19 Claims, 6 Drawing Sheets

FAN SYSTEM AND STARTING METHOD THEREOF

CROSS REFERENCE TO RELATED APPLICATIONS

This Non-provisional application claims priority under 35 U.S.C. §119(a) on patent application No(s). 095144573 filed in Taiwan, Republic of China on Dec. 1, 2006, the entire contents of which are hereby incorporated by reference.

BACKGROUND OF THE INVENTION

1. Field of Invention

The invention relates to a fan system and a starting method thereof, and, in particular, to a fan system and a starting method thereof capable of enhancing the stability and the security.

2. Related Art

With the high development of the technology, the requirements on the functions of an electronic apparatus are getting higher and higher, the number of the used electronic elements and the integration are getting higher and higher, and the heat dissipating requirement is also getting higher and higher. Therefore, the heat dissipating function directly influences the reliability and the lifetime of the electronic apparatus.

A fan is frequently used to serve as a heat-dissipating device, and the number of fans is usually increased or decreased according to different requirements of the corresponding clients when being used at a customer system end. In addition, the rotating speed of each fan in the fan system is controlled and driven by a controlling device or a controlling chip so that the rotating speed of the fan may be adjusted according to the actual operating conditions of the customer system.

As shown in FIG. 1, a conventional fan system is electrically connected with a customer system end $SB_1$. The fan system includes a hot-swap controlling device 11, a controlling device 12 and a fan device 13. Usually, the customer system end $SB_1$ provides main power $MP_1$ and sub-power $SP_1$ and includes a connector $C_1$ for transmitting a first driving signal S01 generated by the main power $MP_1$ and a second driving signal S02 generated by the sub-power $SP_1$ to the fan system.

The hot-swap controlling device 11 includes a plurality of hot-swap elements 111 and 112 electrically connected to each other, and a plurality of pins 113. The hot-swap elements 111 and 112 are electrically connected with the customer system end $SB_1$, the controlling device 12 and the fan device 13, and receive the first driving signal S01 and the second driving signal S02, respectively.

The controlling device 12 is a digital signal processor or a microprocessor, and the hot-swap element 112 transmits the second driving signal S02 to start the controlling device 12.

The fan device 13 is electrically connected with the controlling device 12, and includes a plurality of fans 131 and a plurality of isolating circuits 132. The hot-swap elements 111 transmit the first driving signals S01 to start the fans 131, respectively, while the isolating circuits 132 are electrically connected with and between the controlling device 12 and the fans 131 to transmit a pulse width modulation (PWM) signal P generated by the controlling device 12 to the fans 131 so that rotating speeds of the fans 131 are controlled according to the PWM signal P.

In general, the fan system has to provide the sufficient heat dissipating requirement for the customer system end $SB_1$ in any state. When one of the fans 131 of the fan system is damaged, the fan can be immediately replaced in a hot-swap manner through the hot-swap element 111 so that the heat dissipating requirement of the customer system end $SB_1$ is kept. However, the hot-swap elements 111 and 112 correspondingly connected to the main power $MP_1$ and the sub-power $SP_1$ of the customer system end $SB_1$ are powered on independently. When the user improperly swaps the fan, the pins 113 of the hot-swap controlling device 11 tend to be bent, and the problem of the poor contact may rise due to the shrank terminal with the connector $C_1$.

In addition, the motor (not shown) of the fan 131 is the dynamic inductive load, and a high start current is required to start the fan 131 from the stationary state to the stable state. At the moment when the fan system is being started, an inrush current, a spike voltage or a spike noise may be generated between the fan system and the connector $C_1$ of the customer system end $SB_1$, or even a spark phenomenon (i.e., an electric arc) is generated, thereby damaging the customer system end $SB_1$ or the fan system.

In addition, the pins 113 of the hot-swap controlling device 11 are now made into a floating connector, as shown in FIG. 2, or a floating board (not shown) to ensure the pins 113 to contact the connector $C_1$ instantaneously. However, this method still cannot effectively and completely suppress the generation of the spike noise on the pins 113. In addition, when the hot-swap is being performed, the positive or negative spike noise generated by the hot-swap elements 111 tends to damage the small-signal electronic element (not shown) of the fan system through the grounding circuit of the main power $MP_1$ and the pins 113. Thus, the isolating circuits 132 are usually provided for the purpose of protection. In addition, if the hot-swap elements 111 are frequently used, the terminals of the pins 113 tend to have the poor contact due to the oxidation, and the lifetime of each of the hot-swap elements 111 tends to be shortened so that the quality of the fan system is deteriorated.

Therefore, it is an important subject to provide a fan system and a starting method thereof capable of effectively suppressing the generation of an inrush current, a spike voltage or a spike noise when the fan system is started, so that a customer system end and the fan system can be simultaneously protected.

SUMMARY OF THE INVENTION

In view of the foregoing, the invention is to provide a fan system and a starting method thereof, wherein when the fan system is started, the generation of an inrush current, a spike voltage or a spike noise can be effectively suppressed so that a customer system end and the fan system can be simultaneously protected.

To achieve the above, the invention discloses a fan system including a connecting device, a controlling device and a fan device. The connecting device includes a first pin for receiving at least one driving signal, and a second pin for receiving a start signal. A length of the first pin is greater than a length of the second pin. The controlling device is electrically connected to the connecting device, generates at least one first enabling signal according to the start signal, and outputs the driving signal and the first enabling signal. The fan device is electrically connected to the controlling device and receives the first enabling signal to control transmission of the driving signal.

To achieve the above, the invention also discloses starting method for a fan system having at least one fan. The starting method includes the steps of receiving at least one driving signal at a first time instant, receiving a start signal at a second time instant, generating at least one first enabling signal according to the start signal, outputting the driving signal and driving the fan according to the first enabling signal.

In addition, the invention further discloses a fan system including a controlling device and a fan device. The controlling device receives at least one driving signal and a start signal, generates at least one first enabling signal according to the start signal, and outputs the driving signal and the first enabling signal. The fan device is electrically connected with the controlling device and receives the first enabling signal to control transmission of the driving signal.

In addition, the invention further discloses a starting method for a fan system having at least one fan. The starting method includes the steps of receiving at least one driving signal and a start signal, generating at least one first enabling signal according to the start signal after a time delay or a time interval, and outputting the driving signal and driving the fan according to the first enabling signal.

As mentioned above, the fan system and the starting method thereof according to the invention have the following features. The length of each of the first pins of the connecting device is greater than that of the second pin thereof so that the first pins are surely electrically connected with the connector at the customer system end. Then, the second pin is electrically connected with the connector and receives the start signal to start the fan (or fans). Alternatively, the delay enabling unit can simultaneously receive the start signal and the driving signal, and the fan is started according to the start signal after the delay time has elapsed. Consequently, the second pin or the delay enabling unit can function to turn on or off the overall fan device, and it is also possible to ensure that no electric arc is generated at the contacts between the first pins or the pins and the connector. Also, it is possible to prevent the positive or negative spike noise from being transmitted to the controlling device and the fan device through the first pins or the pins. In addition, the fan system may further reach the overall stable state within the delay time. Furthermore, the isolation protecting unit can effectively suppress the spike voltage or the inrush current generated by the main power circuit at the end of the fan device when the controlling device transmits the driving signals to the fan device, and suppress the spike noise generated at the instant when the fan device is started.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
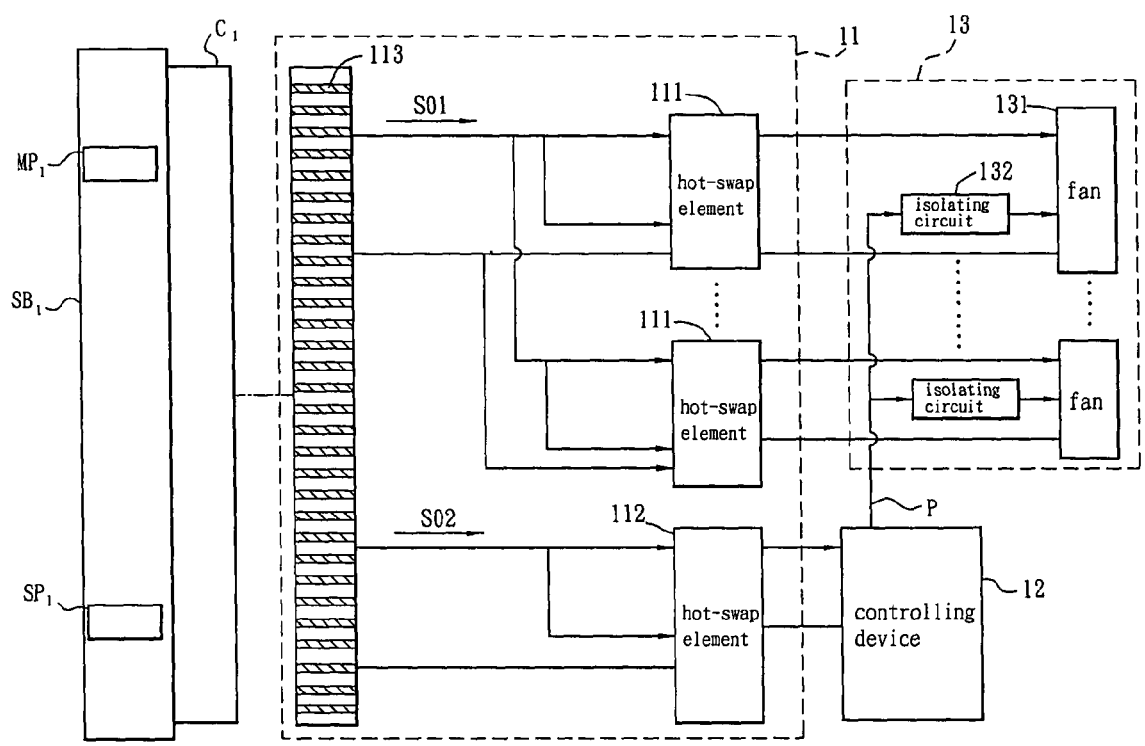
FIG. 1 is a schematic illustration showing a conventional fan system.
Figure 2:
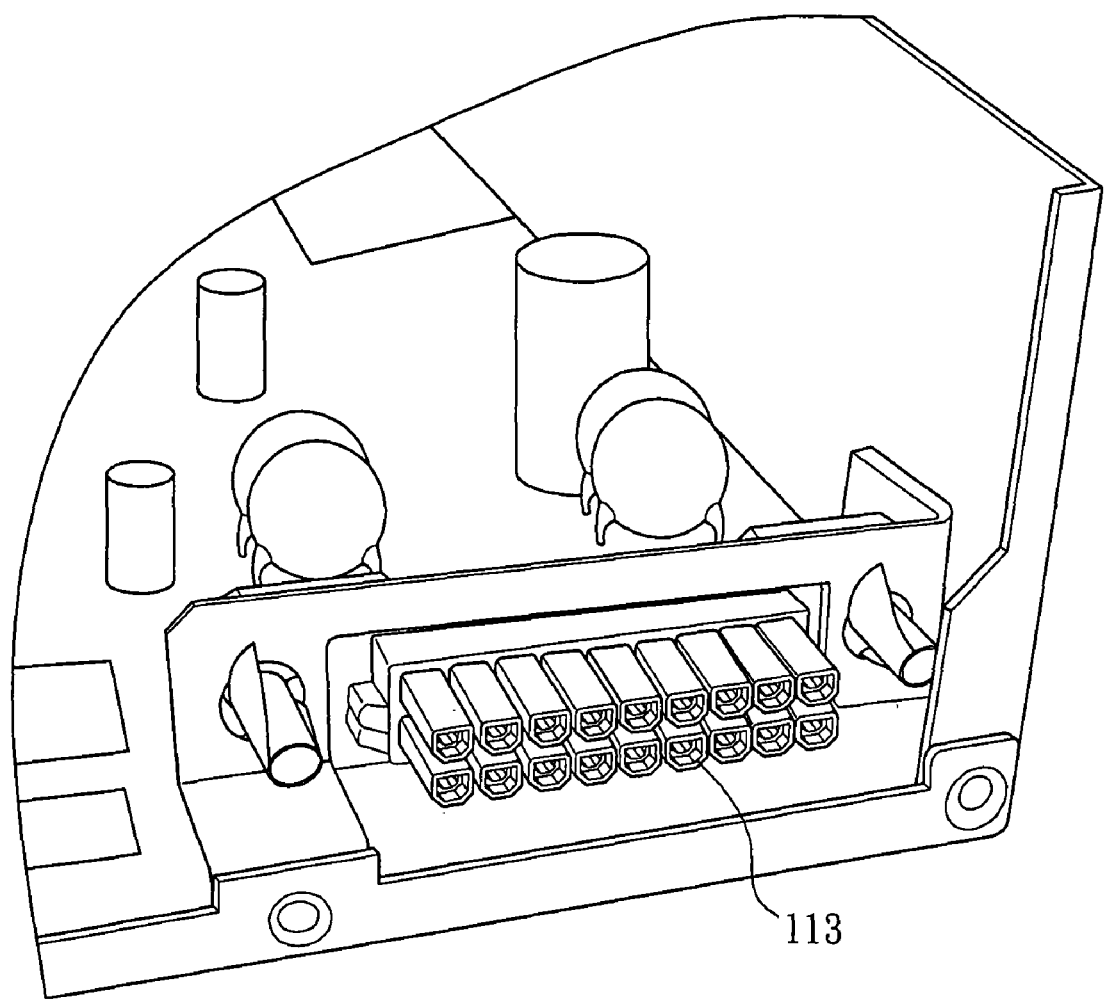
FIG. 2 shows structures of pins in a hot-swap controlling device of the conventional fan system.
Figure 3:
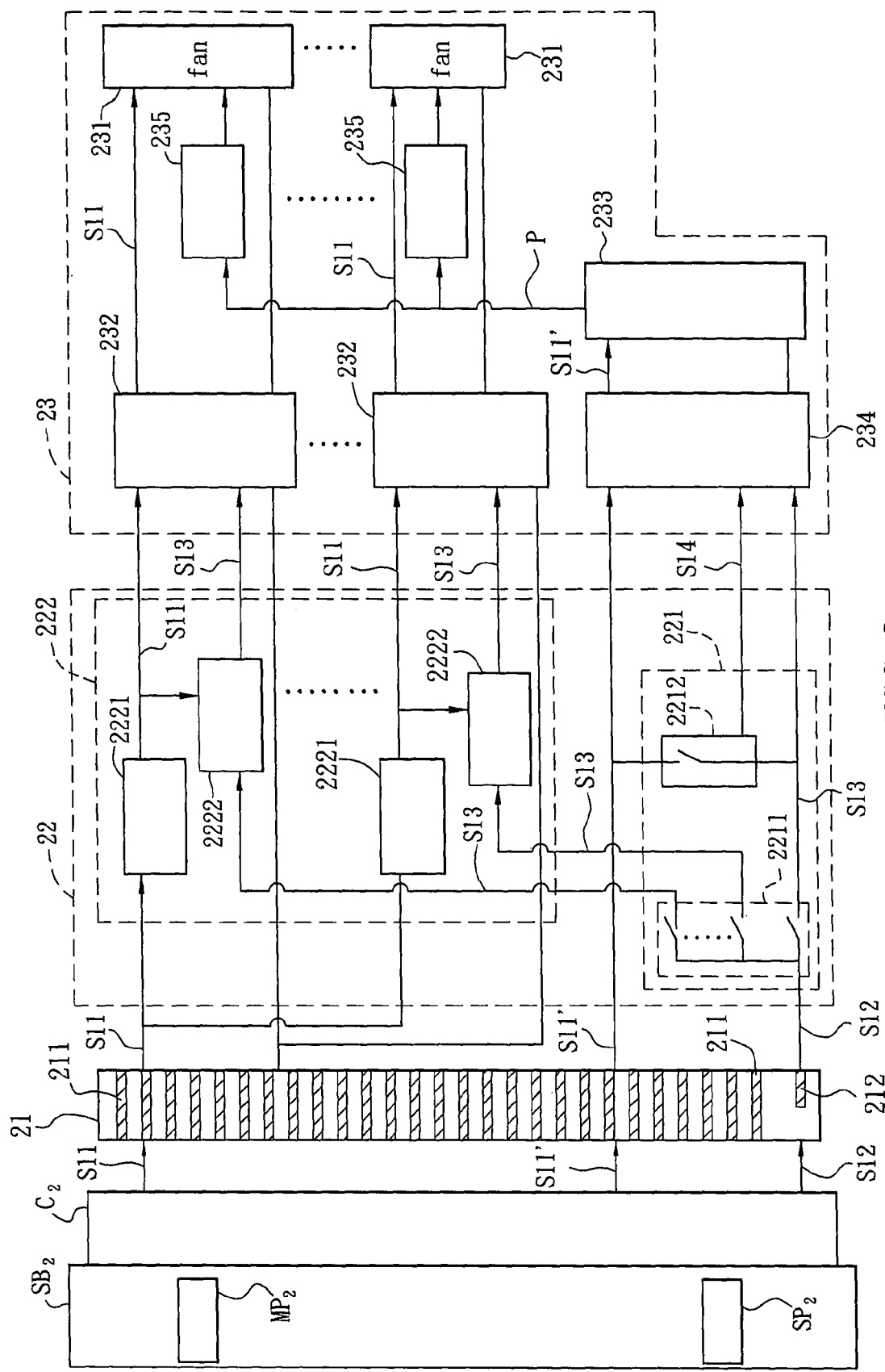
FIG. 3 is a schematic illustration showing a fan system according to a first embodiment of the invention.

As shown in FIG. 3, a fan system according to a first embodiment of the invention includes a connecting device 21, a controlling device 22 and a fan device 23. The fan system of this implemented embodiment is electrically connected with a connector $C_2$ of a customer system end $SB_2$ and receives at least one of driving signals S11 and S11' and a start signal S12 provided from the customer system end $SB_2$. In addition, the driving signals S11 and S11' and the start signal S12 have different voltage levels in this embodiment, and the driving signal S11 is generated by main power $MP_2$ of the customer system end $SB_2$ in implementation. The driving signal S11' is generated by sub-power $SP_2$, and the start signal S12 is a low voltage signal or a ground signal. Herein, the start signal S12 is the ground signal in the illustrated example.

The connecting device 21 of this embodiment has a plurality of first pins 211 and a second pin 212 and is electrically connected with the connector $C_2$ of the customer system end $SB_2$. For example, the first pins 211 and the second pin 212 are inserted into the connector $C_2$ and are thus electrically connected with a plurality of pins (not shown) of the connector $C_2$ to receive the driving signals S11 and S11' and the start signal S12. In addition, the first pins 211 have the same length, which is greater than a length of the second pin 212.

In this embodiment, the controlling device 22 is electrically connected with the first pins 211 and the second pin 212 of the connecting device 21, and has an enabling unit 221 and an isolation protecting unit 222 electrically connected with the enabling unit 221.

The enabling unit 221 includes at least one first switch element 2211 and a second switch element 2212. Herein, the enabling unit 221 includes a plurality of first switch elements 2211, and the second switch element 2212 is electrically connected with one of the first switch elements 2211. In this embodiment, the first switch elements 2211 simultaneously receive the start signal S12 and are turned on according to the start signal S12 to generate a first enabling signal S13. The second switch element 2212 turns on according to the first enabling signal S13 to generate a second enabling signal S14.

The isolation protecting unit 222 includes at least one first protection circuit 2221 and at least one first isolating circuit 2222 electrically connected with the first protection circuit 2221. Herein, the number of the first protection circuits 2221 and the number of the first isolating circuits 2222 are the same. In this embodiment, the first protection circuits 2221 are electrically connected with the fan device 23, and receive the driving signals S11. The first protection circuits 2221 ensure that the driving signals S11 may be stably transmitted to the fan device 23, and prevent a reverse current from being generated. The first isolating circuits 2222 are respectively electrically connected with others of the first switch elements 2211 (i.e., the first switch elements 2211 that are not connected to the second switch element 2212) and the fan device 23. The first isolating circuits 2222 transmit the first enabling signal S13 and isolate the grounds of the driving signals S11 from the ground of the first enabling signal S13 to prevent the positive or negative spike noise from damaging the post-stage fan device 23 through the grounding circuit of the main power $MP_2$.

Furthermore, the fan device 23 of this embodiment includes at least one fan 231, at least one first hot-swap controlling unit 232 and a controlling unit 233. In practice, a plurality of fans 231, a plurality of first hot-swap controlling units 232 and a controlling unit 233 are provided. The first hot-swap controlling units 232 are electrically connected with the controlling device 22, and are respectively electrically connected with the isolation protecting unit 222 and the fans 231 in order to receive the first enabling signal S13 simultaneously and to transmit the driving signals S11 to start the fans 231. In addition, the fan device 23 further includes a second hot-swap controlling unit 234, which is electrically connected with the enabling unit 221 and the controlling unit 233, receives the second enabling signal S14 and transmits the driving signal S11' to the controlling unit 233 according to the second enabling signal S14.

In this embodiment, the controlling unit 233 is electrically connected with the fans 231, and generates a PWM signal P to control the rotating speeds of the fans 231. In addition, the controlling unit 233 is driven by the driving signal S11'. In practice, the controlling unit 233 of this embodiment may be a microprocessor, a digital signal processor or a controlling chip.

In addition, the fan device 23 further includes at least one second isolating circuit 235 electrically connected with and between the controlling unit 233 and the fan 231. In practice, a plurality of second isolating circuits 235 are provided, and the number of the second isolating circuits 235 is the same as that of the fans 231. The second isolating circuits 235 isolate the grounds of the driving signals S11 from the ground of the controlling unit 233, and stably transmit the PWM signal P from the controlling unit 233 to the fans 231.

Herein, the operation method of the fan system of this embodiment will be described in the following. When the fan system is to be electrically connected with the customer system end $SB_2$, the first pins 211 of the connecting device 21 are first in contact with the connector $C_2$. At this time, the controlling device 22 simultaneously receives the driving signals S11 and S11' through the first pins 211. Next, the second pin 212 is further in contact with the connector $C_2$, and receives the start signal S12. That is, an interval time exists between the start signal S12 and each of the driving signals S11 and S11' and the driving signals S11 and S11' are sequentially inputted to the fan system. At this time, the enabling unit 221 of the controlling device 22 generates the first enabling signal S13 according to the start signal S12, and simultaneously turns on the second switch element 2212 to generate the second enabling signal S14, and transmits the second enabling signal S14 to the fan device 23. The isolation protecting unit 222 ensures that the driving signal S11 and the first enabling signal S13 may be directly transmitted to the fan device 23 without being reversely inputted to the customer system end $SB_2$ and the enabling unit 221. The first hot-swap controlling units 232 of the fan device 23 transmit the driving signals S11 to the fans 231 to start the fans 231 according to the first enabling signals S13, while the second hot-swap controlling unit 234 makes the driving signal S11' start the controlling unit 233 according to the second enabling signal S14 and the controlling unit 233 controls the rotating speeds of the fans 231 with the PWM signal P.

The length of each of the first pins 211 of the connecting device 21 is greater than that of the second pin 212, so the fan 231 cannot immediately start until the first pins 211 have received the driving signals S11. The controlling device 22 does not start to operate and to drive the fan 231 according to the start signal S12 until the second pin 212 has received the start signal S12. According to this manner, the second pin 212 functions to turn on or turn off the overall fan device 23, and it is also possible to ensure that no electric arc and positive or negative spike noise is generated when the first pins 211 receive the driving signals S11. In addition, the isolation protecting unit 222 can effectively suppress the spike voltage or the inrush current generated by the main power $MP_2$ at the end of the fan device 23 when the controlling device 22 is transmitting the driving signals S11 to the fan device 23. Also, the isolation protecting unit 222 can further suppress the spike noise generated at the instant when the fan device 23 is started in conjunction with the first hot-swap controlling unit 232.

Figure 4:
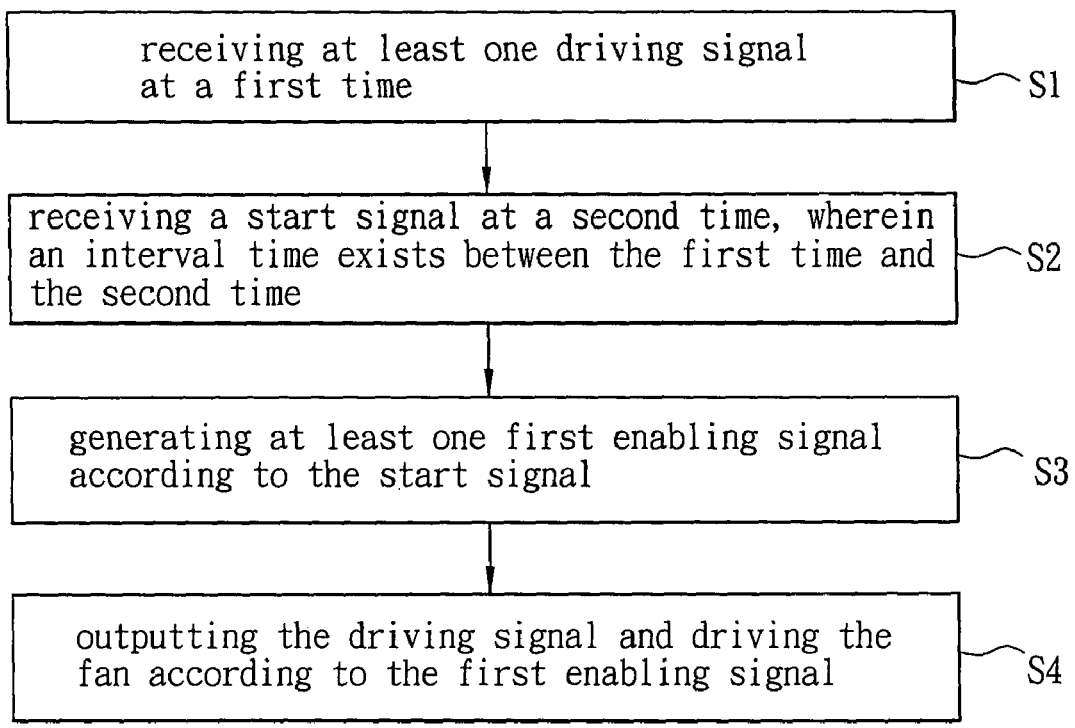
FIG. 4 is a flow chart showing a starting method for the fan system according to the first embodiment of the invention.

The starting method for the fan system according to the first embodiment of the invention will be described in the following. As shown in FIG. 4, the starting method of the fan system according to the first embodiment of the invention may be applied to the fan system of the first embodiment (see FIG. 3), and is applied to the fan system in the following example.

In this example, the starting method for the fan system includes steps S1 to S4.

In step S1, at least one of driving signals S11 and S11' is received at a first time instant.

In step S2, a start signal S12 is received at a second time instant, wherein an interval time exists between the first time instant and the second time instant, and the start signal S12 is a low voltage signal or a ground signal.

In step S3, at least one first enabling signal S13 is generated according to the start signal S12.

In step S4, the driving signal S11 is outputted and the fan is driven according to the first enabling signal S13.

Figure 5:
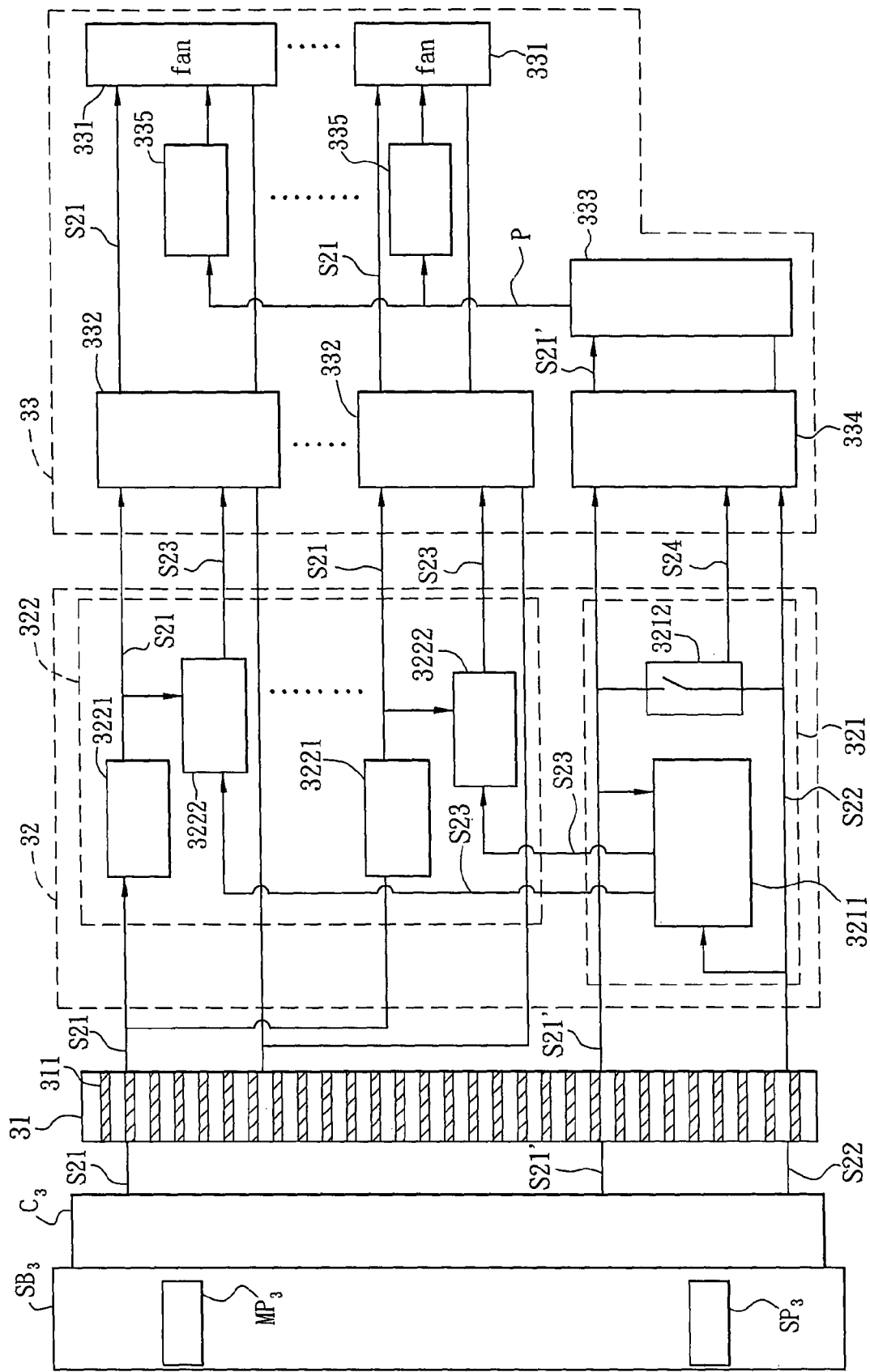
FIG. 5 is a schematic illustration showing a fan system according to a second embodiment of the invention.

The fan system according to a second embodiment of the invention will be described with reference to FIG. 5. Referring to FIG. 5, the fan system includes a connecting device 31, a controlling device 32 and a fan device 33. The fan system is electrically connected with a connector $C_3$ of a customer system end $SB_3$. The connection between the fan system and the customer system end $SB_3$ and the structure, feature and effect of the customer system end $SB_3$ in this embodiment are the same as those in the first embodiment (see FIG. 3), so detailed descriptions thereof will be omitted. The customer system end $SB_3$ of this embodiment supplies a start signal S22 and at least one of driving signals S21 and S21', and the start signal S22 and the at least one of the driving signals S21 and S21' in the second embodiment and the start signal S12 and the driving signals S11 in the first embodiment have the same features and effects, so detailed descriptions thereof will be omitted.

In addition, the connecting device 31 of this embodiment includes a plurality of pins 311 for receiving the driving signals S21 and S21' and the start signal S22 transmitted from the customer system end $SB_3$.

The controlling device 32 includes a delay enabling unit 321 and an isolation protecting unit 322, and is electrically connected with the pins 311 of the connecting device 31.

The delay enabling unit 321 includes a delay enabling circuit 3211 and a switch element 3212. In addition, the delay enabling circuit 3211 may be implemented as a typical RC delay circuit, which has a resistor (not shown) and a capacitor (not shown) electrically connected to each other. The combination of the resistor and the capacitor is for generating a delay time. When the delay enabling circuit 3211 and the switch element 3212 simultaneously receive the start signal S22, the delay enabling circuit 3211 does not generate a first enabling signal S23 according to the start signal S22 until the delay time has elapsed, and the switch element 3212 turns on according to the start signal S22 to generate a second enabling signal S24. The first enabling signal S23 and the second enabling signal S24 according to the second embodiment and the first enabling signal S23 and the second enabling signal S24 according to the first embodiment have the same features and effects, so detailed descriptions thereof will be omitted.

The isolation protecting unit 322 of this embodiment includes at least one first protection circuit 3221 and at least one first isolating circuit 3222, and the first protection circuit 3221 is electrically connected with the first isolating circuit 3222. In the current example to be described, the isolation protecting unit 322 includes the first protection circuits 3221 and the first isolating circuits 3222, wherein the number of the first protection circuits 3221 is equal to the number of the first isolating circuits 3222. In this embodiment, the first protection circuits 3221 are electrically connected with the fan device 33 and receive the driving signals S21, and the first protection circuits 3221 ensure that the driving signals S21 may be stably transmitted to the fan device 33 to prevent the reverse current from being generated. The first isolating circuits 3222 are electrically connected with the delay enabling circuit 3211 of the delay enabling unit 321 and the fan device 33. The first isolating circuits 3222 isolate the grounds of the driving signals S21 from the ground of the first enabling signal S23 to prevent the positive or negative spike noise from damaging the post-stage fan device 33 through a grounding circuit of main power $MP_3$. Also, the first isolating circuits 3222 have the effect of transmitting the first enabling signal S23.

The fan device 33 of this embodiment includes at least one fan 331, at least one first hot-swap controlling unit 332 and a controlling unit 333. In practice, the fan device 33 has a plurality of fans 331, a plurality of first hot-swap controlling units 332 and a controlling unit 333, and the first hot-swap controlling units 332 are electrically connected with the isolation protecting unit 322 of the controlling device 32 and the fans 331, respectively. In addition, the fan device 33 further includes a second hot-swap controlling unit 334, which is electrically connected with the delay enabling unit 321 and the controlling unit 333. In addition, the fan device 33 further includes at least one second isolating circuit 335, which is electrically connected with and between the controlling unit 333 and the fan 331. In practice, several second isolating circuits 335 may be utilized, and the number of the second isolating circuits 335 corresponds to that of the fans 331.

The features and effects of the fans 331, the first hot-swap controlling units 332, the controlling unit 333, the second isolating circuits 335 and the second hot-swap controlling unit 334 of the fan device 33 according to this embodiment are the same as those of the fans 231, the first hot-swap controlling units 232, the controlling unit 233, the second isolating circuits 235 and the second hot-swap controlling unit 234 of the fan device 23 according to the first embodiment, so detailed descriptions thereof will be omitted.

Herein, the operation method of the fan system of this embodiment will be described in the following. When the fan system is electrically connected with the customer system end $SB_3$, the controlling device 32 simultaneously receives the driving signals S21 and S21' and the start signal S22 through the pins 311 of the connecting device 31. At this time, the switch element 3212 generates the second enabling signal S24 according to the start signal S22 and transmits the second enabling signal S24 to the fan device 33, while the delay enabling circuit 3211 generates the delay time and generates the first enabling signal S23 according to the start signal S22 only after the delay time has elapsed. The isolation protecting unit 322 isolates the ground of the driving signal S21 from the ground of the first enabling signal S23, and ensures that the driving signal S21 and the first enabling signal S23 can be directly transmitted to the fan device 33 without being reversely inputted to the customer system end $SB_3$ and the delay enabling unit 321. The first hot-swap controlling units 332 of the fan device 33 transmit the driving signals S21 to the fans 331 according to the first enabling signals S23 to start the fans 331. The second hot-swap controlling unit 334 makes the driving signal S21' start the controlling unit 333 according to the second enabling signal S24, and the controlling unit 333 controls the rotating speeds of the fans 331 with the PWM signal P.

The delay enabling unit 321 delays the enabling time using the delay enabling circuit 3211. So, the fan 331 will not be immediately started after the controlling device 32 simultaneously receives the start signal S22 and the driving signals S21 and S21'. Instead, the delay enabling unit 321 does not start to operate and drive the fans 331 according to the start signal S22 until the delay time has elapsed. According to this manner, the delay enabling unit 321 functions to turn on or turn off the overall fan device 33, and it is further possible to make the overall fan system reach the stable state within the delay time. It is also possible to prevent the electric arc and the positive or negative spike noise from being generated at the instant when the pins 311 receive the driving signals S21 and S21'. Of course, this embodiment also has the same effect as that of the isolation protecting unit 222 according to the first embodiment, so detailed descriptions thereof will be omitted.

Figure 6:
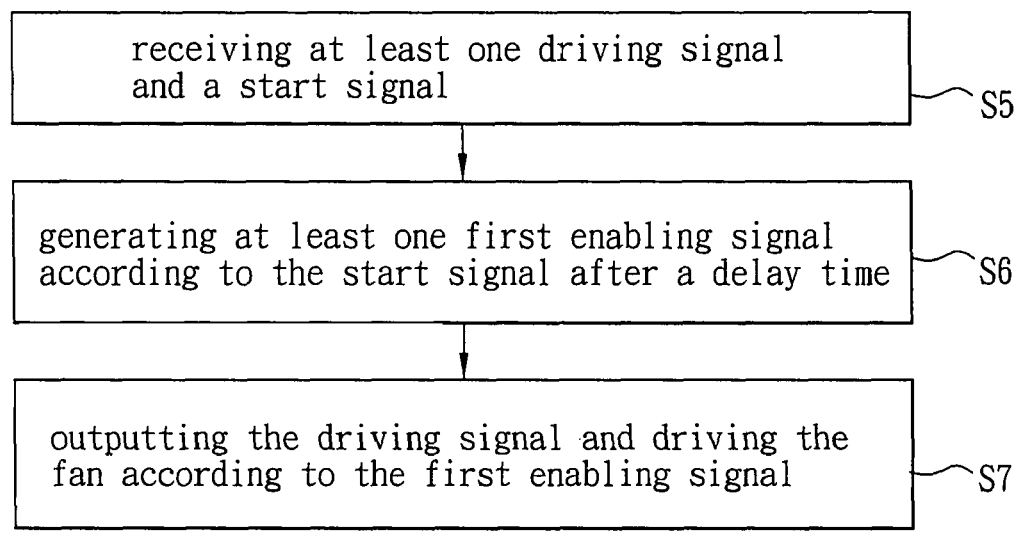
FIG. 6 is a flow chart showing a starting method for the fan system according to the second embodiment of the invention.

As shown in FIG. 6, the starting method for the fan system according to the second embodiment of the invention will be described in the following with reference to the example of the fan system (see FIG. 5).

In this example, the starting method for the fan system includes steps S5 to S7.

In step S5, at least one of driving signals S21 and S21' and a start signal S22 are received.

In step S6, at least one first enabling signal S23 is generated according to the start signal S22 after a delay time. The start signal S22 of this embodiment is a low voltage signal or a ground signal.

In step S7, the driving signals S21 and S21' are outputted and the fan is driven according to the first enabling signal S23.

In summary, the fan system and the starting method thereof according to the invention have the following features. The length of each of the first pins of the connecting device is greater than that of the second pin thereof so that the first pins are surely electrically connected with the connector at the customer system end. Then, the second pin is electrically connected with the connector and receives the start signal to start the fan (or fans). Alternatively, the delay enabling unit can simultaneously receive the start signal and the driving signal, and the fan is started according to the start signal after the delay time has elapsed. Consequently, the second pin or the delay enabling unit can function to turn on or off the overall fan device, and it is also possible to ensure that no electric arc is generated at the contacts between the first pins or the pins and the connector. Also, it is possible to prevent the positive or negative spike noise from being transmitted to the controlling device and the fan device through the first pins or the pins. In addition, the fan system may further reach the overall stable state within the delay time. Furthermore, the isolation protecting unit can effectively suppress the spike voltage or the inrush current generated by the main power circuit at the end of the fan device when the controlling device transmits the driving signals to the fan device, and suppress the spike noise generated at the instant when the fan device is started.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan system, comprising:
a controlling device for receiving at least one driving signal and a start signal, generating at least one first enabling signal according to the start signal, and outputting the driving signal and the first enabling signal; and a fan device electrically connected with the controlling device and receiving the first enabling signal to control transmission of the driving signal, wherein the controlling device comprises a delay enabling unit, which comprises:

a delay enabling circuit for generating the first enabling signal according to the start signal after a delay time; and a switch element for generating a second enabling signal according to the start signal.

2. The fan system according to claim 1, wherein the start signal is a low voltage signal or a ground signal.

3. The fan system according to claim 1, wherein the fan device comprises at least one fan and at least one first hot-swap controlling unit electrically connected with the controlling device and the fan to transmit the driving signal to the fan according to the first enabling signal.

4. The fan system according to claim 1, wherein the delay enabling circuit comprises a resistor and a capacitor electrically connected with each other to generate the delay time.

5. The fan system according to claim 1, wherein the controlling device further comprises an isolation protecting unit, which comprises:

at least one first protection circuit for receiving the driving signal; and at least one first isolating circuit electrically connected with the first protection circuit and the delay enabling circuit for isolating the driving signal from the first enabling signal.

6. The fan system according to claim 1, wherein the fan device further comprises at least one fan and a controlling unit electrically connected with the fan, the fan device transmits the driving signal to the controlling unit according to the second enabling signal, and the controlling unit generates a PWM signal to control a rotating speed of the fan.

7. The fan system according to claim 6, wherein the controlling unit is a microprocessor, a digital signal processor or a controlling chip.

8. The fan system according to claim 6, wherein the fan device further comprises at least one second isolating circuit electrically connected with the controlling unit and the fan for transmitting the PWM signal to the fan.

9. The fan system according to claim 6, wherein the fan device further comprises a second hot-swap controlling unit electrically connected with the controlling device and the controlling unit of the fan device, and transmitting the driving signal to the controlling unit according to the second enabling signal.

10. The fan system according to claim 1, further comprising:

a connecting device having a first pin for receiving the driving signal, and a second pin for receiving the start signal, wherein a length of the first pin is greater than a length of the second pin, and the controlling device is electrically connected to the connecting device.

11. The fan system according to claim 10, wherein the controlling device comprises an enabling unit, the enabling unit comprising:

at least one first switch element for generating the first enabling signal according to the start signal; and a second switch element electrically connected with the first switch element and generating a second enabling signal according to the first enabling signal.

12. A fan system, comprising:

a controlling device for receiving at least one driving signal and a start signal, generating at least one first enabling signal according to the start signal, and outputting the driving signal and the first enabling signal;

a fan device electrically connected with the controlling device and receiving the first enabling signal to control transmission of the driving signal; and a connecting device having a first pin for receiving the driving signal, and a second pin for receiving the start signal, wherein a length of the first pin is greater than a length of the second pin, and the controlling device is electrically connected to the connecting device, wherein the controlling device comprises an enabling unit, the enabling unit comprising:

at least one first switch element for generating the first enabling signal according to the start signal; and a second switch element electrically connected with the first switch element and generating a second enabling signal according to the first enabling signal, wherein the controlling device further comprises an isolation protecting unit comprising:

at least one first protection circuit electrically connected with the first pin of the connecting device and the fan device; and at least one first isolating circuit electrically connected with the first protection circuit and the first switch element to isolate the driving signal from the first enabling signal.

13. A starting method for a fan system having at least one fan, the starting method comprising the steps of:

receiving at least one driving signal and a start signal;

generating at least one first enabling signal and a second enabling signal according to the start signal after a time delay or a time interval;

outputting the driving signal to drive the fan according to the first enabling signal; and generating a PWM signal to control a rotating speed of the fan according to the second enabling signal.

14. The method according to claim 13, wherein a controlling device of the fan system generates the first enabling signal according to the start signal.

15. The method according to claim 13, wherein a fan device of the fan system transmits the driving signal according to the first enabling signal.

16. The method according to claim 13, wherein the start signal is a low voltage signal or a ground signal.

17. The method according to claim 13, wherein the fan system receives the driving signal at a first time.

18. The method according to claim 17, wherein the fan system receives the start signal at a second time, and an interval exists between the second time and the first time.

19. A starting method for a fan system having at least one fan, the starting method comprising the steps of:

receiving at least one driving signal at a first time;

receiving a start signal at a second time;

generating at least one first enabling signal and a second enabling signal according to the start signal;

outputting the driving signal to drive the fan according to the first enabling signal; and generating a PWM signal to control a rotating speed of the fan according to the second enabling signal.

* * * * *